United States Patent
Teraoka et al.

(10) Patent No.: US 11,214,856 B2
(45) Date of Patent: Jan. 4, 2022

(54) FERRITIC STAINLESS STEEL SHEET, HOT COIL, AND AUTOMOBILE EXHAUST FLANGE MEMBER

(71) Applicant: NIPPON STEEL CORPORATION, Tokyo (JP)

(72) Inventors: Shinichi Teraoka, Tokyo (JP); Shinichi Tamura, Tokyo (JP); Akihiro Nishimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 177 days.

(21) Appl. No.: 16/489,649

(22) PCT Filed: Feb. 28, 2017

(86) PCT No.: PCT/JP2017/007965
§ 371 (c)(1),
(2) Date: Aug. 28, 2019

(87) PCT Pub. No.: WO2018/158853
PCT Pub. Date: Sep. 7, 2018

(65) Prior Publication Data
US 2020/0002793 A1   Jan. 2, 2020

(51) Int. Cl.
*C22C 38/60* (2006.01)
*C22C 38/00* (2006.01)
(Continued)

(52) U.S. Cl.
CPC .............. *C22C 38/60* (2013.01); *C21D 6/004* (2013.01); *C21D 8/0205* (2013.01);
(Continued)

(58) Field of Classification Search
CPC ..... C22C 38/60; C22C 38/001; C22C 38/002; C22C 38/005; C22C 38/008; C22C 38/02;
(Continued)

(56) References Cited

U.S. PATENT DOCUMENTS

2016/0083823 A1   3/2016 Horikami et al.
2017/0107593 A1*  4/2017 Hamada ................. C22C 38/00

FOREIGN PATENT DOCUMENTS

CN   105121685 A   12/2015
JP   60-228616 A   11/1985
(Continued)

OTHER PUBLICATIONS

International Search Report for PCT/JP2017/007965 dated May 30, 2017.
(Continued)

*Primary Examiner* — Humera N. Sheikh
*Assistant Examiner* — Katherine A Christy
(74) *Attorney, Agent, or Firm* — Birch, Stewart, Kolasch & Birch, LLP (57) ABSTRACT

A ferritic stainless steel plate having a sheet thickness t of 5.0 to 12.0 mm, including a chemical composition consisting of, in mass percent, C: 0.001 to 0.010%, Si: 0.01 to 1.0%, Mn: 0.01 to 1.0%, P: 0.04% or less, S: 0.010% or less, Cr: 10.0 to 20.0%, Ni: 0.01 to 1.0%, Ti: 0.10 to 0.30%, V: 0.01 to 0.40%, Al: 0.005 to 0.3%, N: 0.001 to 0.02%, and as necessary, one or more of B, Mo, Cu, Mg, Sn, Sb, Zr, Ta, Nb, Hf, W, Co, Ca, REM, and Ga, with the balance being Fe and unavoidable impurities, wherein in a steel micro-structure, on a cross section parallel to a rolling direction, an area ratio of structures each satisfying: major grain diameter/minor grain diameter being 5.0 or more is 90% or more, and an average minor grain diameter of the structures is 100 μm or less.

8 Claims, 2 Drawing Sheets

(51) Int. Cl.

| | |
|---|---|
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *F16L 23/032* | (2006.01) |
| *C21D 6/00* | (2006.01) |
| *C21D 8/02* | (2006.01) |
| *C21D 9/46* | (2006.01) |

(52) U.S. Cl.
CPC .............. *C21D 8/0226* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C21D 2211/005* (2013.01); *F16L 23/032* (2013.01)

(58) Field of Classification Search
CPC ......... C22C 38/04; C22C 38/06; C22C 38/42; C22C 38/44; C22C 38/46; C22C 38/48; C22C 38/50; C22C 38/52; C22C 38/54; F16L 23/032
USPC .......................................................... 420/36
See application file for complete search history.

(56) References Cited

FOREIGN PATENT DOCUMENTS

| | | | |
|---|---|---|---|
| JP | 8-199237 A | 8/1996 | |
| JP | 2000-169943 A | 6/2000 | |
| JP | 2012-140687 A | 7/2012 | |
| JP | 2012-140688 A | 7/2012 | |
| JP | 2015187290 A * | 10/2015 | ............. C21D 6/002 |
| JP | 2015-190025 A | 11/2015 | |
| WO | WO 2015/147211 A1 | 10/2015 | |

OTHER PUBLICATIONS

Notice of Reasons for Refusal for JP 2017-536601 dated Sep. 5, 2017.
Written Opinion of the International Searching Authority for PCT/JP2017/007965 (PCT/ISA/237) dated May 30, 2017.
International Preliminary Report on Patentability and English translation of the Written Opinion of the International Searching Authority (Forms PCT/IB/326, PCT/IB/373, and PCT/ISA/237) for International Application No. PCT/JP2017/007965, dated Sep. 12, 2019.

* cited by examiner

FERRITIC STAINLESS STEEL SHEET, HOT COIL, AND AUTOMOBILE EXHAUST FLANGE MEMBER

TECHNICAL FIELD

The present invention relates to a ferritic stainless steel sheet, a hot coil, and an automobile exhaust flange member.

BACKGROUND ART

An exhaust gas passage of an automobile is made up of various components including an exhaust manifold, an exhaust gas recirculation (EGR), a muffler, a catalyst, a Diesel particulate filter (DPF), a urea selective catalytic reduction (SCR), a flexible tube, a center pipe, a front pipe, and the like. To connect these components, coupling components called flanges are often used. For automobile exhaust components, flange coupling is positively employed because the flange coupling reduces working hours for work as well as spaces for work.

From the viewpoint of preventing noise caused by vibration and ensuring rigidity, thick flanges having thicknesses of 5 mm or more are often used. Flanges are produced through processes such as punching and press forming, and a steel sheet made of a conventional common steel has been used as a starting material of flanges. However, flanges made of a common steel, which are poor in corrosion resistance as compared with other exhaust components made of a stainless steel, shows rust, which in some cases mar their appearance. Hence, in place of common steel sheets, stainless steel sheets have been positively employed as starting materials of flanges.

A ferritic stainless steel has a low toughness as compared with a common steel because the ferritic stainless steel contains Cr and is difficult to refine its steel micro-structure through phase transformation. In particular, a stainless steel containing high Cr, Al, and Si has a problem of its low toughness, and therefore measures such as heating a coil of a stainless steel before causing the stainless steel to run and reducing a thickness of a hot-rolled steel sheet.

To produce a hot-rolled steel sheet or a hot-rolled-annealed steel sheet made of a ferritic stainless steel having a sheet thickness of 5 mm or more, an increase in the sheet thickness further degrades its toughness. A steel sheet, when uncoiled, is prone to sheet breakage through a leveling process, a cutting process, an annealing process of a hot-rolled steel sheet, a pickling process, and the like. To pass a steel sheet through the above processes, it is often necessary to connect coils by welding. However, an increased plate thickness extends a time taken for the welding, which causes a decrease in temperature of heated coil and may bring about a brittle breakage. In a case of being in need of a steel sheet made of a ferritic stainless steel having a sheet thickness of more than 5 mm, it has been a conventional practice to produce the steel sheet as a steel plate, which raises a problem in that its production costs are high as compared with a case where the steel sheet is produced as a heat rolled coil.

There have been a plurality of ideas presented for solving the problem relating to toughness of ferritic stainless steel sheet.

For example, JP60-228616A (Patent Document 1) discloses a producing method for obtaining a high-purity ferritic-stainless-steel-based hot-rolled steel strip that is so excellent in toughness that any trouble, such as cracking, associated with cold uncoiling, cold rolling, and various handlings is less likely to occur, in the method, immediately after subjected to hot rolling, a steel strip is rapidly cooled at a cooling rate of 10° C./sec or more and coiled at a temperature of 450° C. or lower. Patent Document 1 describes that the technique decreased impact fracture transition temperature to −20° C. or less, and describes by way of its examples whether each of coils having a sheet thickness of 3 mm was successfully uncoiled. Patent Documents 1 describes that this technique makes it possible to avoid employing a producing method that leads to large variations in toughness value of hot-rolled steel strips, such as immersing hot-rolled steel strips in a water tank to subject them to water cooling.

JP8-199237A (Patent Document 2) describes a method for producing a hot-rolled steel strip having a sheet thickness of 4.5 mm or more and 9.0 mm or less from a ferritic stainless steel that contains 0.20% to 0.80% of Nb and Cr: more than 13.5% to 15.5% and that is excellent in low-temperature toughness when formed into a hot-rolled steel sheet, in which, immediately after subjected to hot rolling at 800° C. or more, a steel strip is cooled and coiled at a temperature that satisfies a relation of t×T≤3600, where t denotes a sheet thickness of the hot-rolled steel strip and T denotes a coiling temperature in the hot rolling.

JP2012-140687A (Patent Document 3) discloses a hot-rolled coil and a hot-rolled annealed coil made of a Ti-containing ferritic stainless steel that has a toughness and a ductility enough to consistently prevent a problem of cracking of materials in a line through which an uncoiled hot-rolled coil runs, and has a sheet thickness of 5 to 12 mm. As means for the prevention, Patent Document 3 describes a producing method in which a coiling temperature is set at 570° C. or more, and a coil is immersed in water after 5 minutes or more elapse from an end of coiling and when a surface temperature of an outermost circumference of the coil is 550° C. or more, and the coil is retained in the water for 15 minutes for more.

In contrast, JP2012-140688A (Patent Document 4) discloses a hot-rolled coil and a hot-rolled annealed coil made of a Nb-containing ferritic stainless steel that has a toughness and a ductility enough to consistently prevent a problem of cracking of materials in a line through which an uncoiled hot-rolled coil runs, and has a sheet thickness of 5 to 10 mm. As means for the prevention, Patent Document 4 describes a producing method in which a stainless-steel slab is subjected to finish rolling at a rolling finishing temperature of 890° C. or more, water-cooled before coiling, and coiled into a coil at a coiling temperature of 400° C., and the coil is immersed into water within 30 minutes from an end of the coiling and retained in the water for 15 minutes for more.

JP2000-169943A (Patent Document 5) discloses a ferritic stainless steel consisting of, in mass percent, C: 0.001 to 0.1%, N: 0.001 to 0.05%, Cr: 10 to 25%, S: 0.01% or less, P: 0.04% or less, Mn: 0.01 to 2%, Si: 0.01 to 2%, O: 0.01% or less, Sn: 0.05% to 2%, with the balance being Fe and unavoidable impurities. Patent Document 5 describes that this ferritic stainless steel does not suffer aging deterioration in its high temperature strength with time even in long-time use at high temperature.

LIST OF PRIOR ART DOCUMENTS

Patent Document

Patent Document 1: JP60-228616A
Patent Document 2: JP8-199237A

Patent Document 3: JP2012-140687A
Patent Document 4: JP2012-140688A
Patent Document 5: JP2000-169943A

SUMMARY OF INVENTION

Technical Problem

For the technique of Patent Document 1, it is difficult to improve a toughness of a thick ferritic stainless steel sheet having a sheet thickness of more than 5 mm.

The technique of Patent Document 2 makes it possible to improve a toughness of a Nb-added steel but fails to obtain an effect of enhancing a toughness of a Ti-added steel.

The improvement in toughness of by subjecting a coil to water cooling a coil, as with the technique of Patent Document 3, has a problem of large fluctuations in cooling rate occurring in the coil, which results in variations in toughness.

The technique of Patent Document 4 is directed to a Nb-containing ferritic stainless steel, where a hot rolling finishing temperature is set at 890° C. or more, coiling is performed at 400° C. or less, and the coil is immersed in water in order to adjust hardness and a Charpy impact value; therefore, as stated in Patent Document 1, a problem arises in that large fluctuations in cooling rate occurs in the coil, which results in variations in toughness.

The technique in Patent Document 5 includes performing hot rolling with a heating temperature set at 1000° C. or more and 1300° C. or less, which therefore fails to reduce grain sizes of a ferritic stainless steel sheet having a plate thickness of more than 5 mm; therefore, it is difficult for the technique to improve toughness.

An objective of the present invention is to solve problems of known techniques and to produce a ferritic stainless steel sheet excellent in toughness efficiently.

Solution to Problem

To solve the above problems, the present inventors conducted detailed studies on a low-temperature toughness of a ferritic stainless steel sheet from standpoints of components, hot-rolling conditions and steel micro-structures, and clarified influences on structure changes and toughness in the manufacturing process.

A titanium-added ferritic stainless steel does not experience phase transformation in its manufacturing process, which makes it difficult to control its steel micro-structure. That is, a slab to be subjected to hot rolling has a plate thickness of 150 to 250 mm and includes a steel microstructure that is a solidification structure, that is, a coarse columnar crystallite. The columnar crystallite has a width of several hundred micrometers to ten-odd millimeters and a length of several millimeters to several centimeters. In the hot rolling, the slab is normally heated to 1100° C. to 1300° C. in a reheating furnace and rolled by reversible rolling using a roughing mill into a sheet bar having a plate thickness of 20 to 40 mm, when most parts of structures recrystallize to be refined to several hundred micrometers in terms of grain size. The sheet bar is rolled in a subsequent finish hot rolling process to have a desired plate thickness. The finish hot rolling is performed normally in a tandem manner, in which rolling is performed in one direction, but in a case of using Steckel mill, even the finish hot rolling is performed in a reversible manner. In the finish hot rolling, structures subjected to the rough hot rolling were only elongated and expanded, and only very few of them experience recrystallization.

The present inventor investigated changes occurring in structures in the above processes and their influences on a material quality and found, through the investigation, that refining rough-hot-rolled structures is very effective to enhance a toughness of a hot-rolled steel sheet. To refine a steel micro-structure, performing severe plastic deformation at low temperature is effective, but when hot rolling is performed at low temperature, recrystallization after the hot rolling is also delayed: therefore, after the rough hot rolling, unrecrystallized portions tend to remain in structures in a rough bar immediately before finish hot rolling. When the rough bar including the remaining unrecrystallized portions is subjected to finish rolling to be produced into a hot-rolled coil and the hot-rolled coil is subjected to cold rolling annealing to be produced into a sheet, the sheet shows coarse surface deterioration called ridging after metal working; therefore, in conventional practices, hot rolling with low temperature heating, which causes unrecrystallized portions to remain in rough-hot-rolled structures, has been avoided in production of a hot-rolled steel strip made of a ferritic stainless steel.

In contrast, as a steel product for a flange as automobile exhaust component, a common steel has been used in conventional practices; however, in recent years, a ferritic stainless steel, which has a high corrosion resistance, has been used. The above flange needs a certain level of thickness but is not needed to have a very high surface texture, and therefore, a steel plate made of a ferritic stainless steel is mainly used. To enhance productivity, it is preferable to use a hot coil made of a ferritic stainless steel. However, the hot coil is needed to have an excellent toughness so as to prevent a breakage from occurring when the hot coil is uncoiled or runs through a leveling process and a pickling process. The toughness tends to decrease particularly as the sheet thickness increases.

Hence, the present inventors conducted studies and found that a toughness of a hot-rolled steel sheet and a toughness of a hot-rolled-annealed steel sheet are enhanced by performing grain refinement on most of structures in a rough bar even when unrecrystallized portions remain in the rough bar. To refine the rough-hot-rolled structures, it is important to set a heating temperature of hot rolling at 940 to 990° C. and to perform a rough-hot-rolling process at a temperature as low as possible. However, an excessively lowered the heating temperature makes it difficult to bring about the recrystallization during a period from the rough-hot-rolling process to a start of finish hot rolling. It is therefore particularly important to inhibit a decrease in temperature of a steel strip during the period from the end of rough hot rolling to the start of finish hot rolling. For flange coupling parts, a steel sheet that is not subjected to cold rolling but subjected to hot rolling, and therefore, there is no problem of the ridging in the first place.

Figure 1:
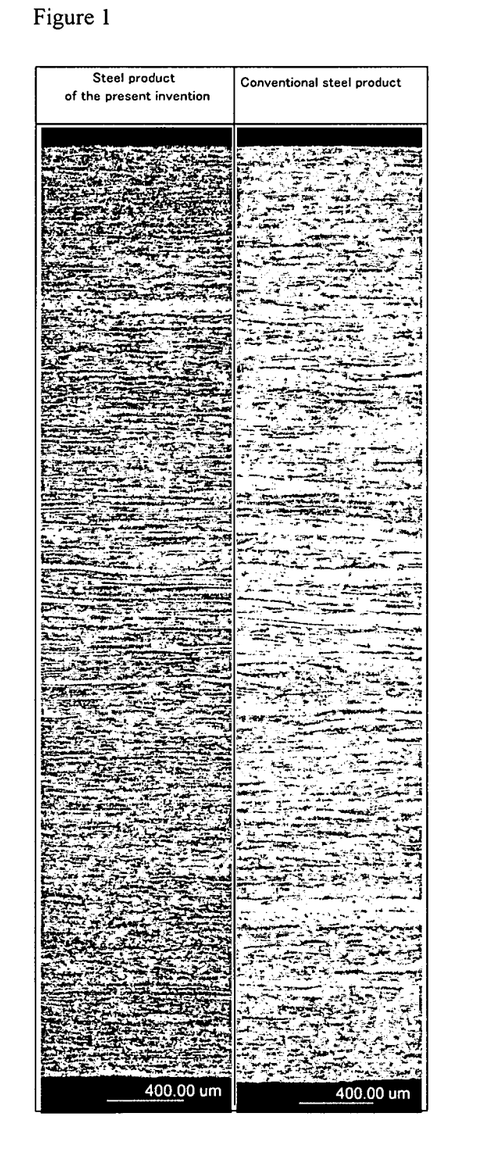
FIG. 1 is a diagram illustrating a microstructure of a steel product according to the present invention and a microstructure of a conventional steel product.

The left side of FIG. 1 is an enlarged view of a microstructure of an example of a steel product according of the present invention, and the right side is an enlarged view of a microstructure of a conventional steel product, and comparison between them shows that the steel product according to the present invention is made up of fine grain structures, and the steel product according to the present invention provides an absorbed energy value in the Charpy impact test of 40 $J/cm^2$ or more, whereas the conventional steel product shows about 20 $J/cm^2$ or less.

The gist of the present invention to solve the problems described above is as follows.

(1) A ferritic stainless steel sheet having a sheet thickness t of 5.0 to 12.0 mm, including
a chemical composition consisting of, in mass percent:
C: 0.001 to 0.010%;
Si: 0.01 to 1.0%;
Mn: 0.01 to 1.0%;
P: 0.04% or less;
S: 0.010% or less;
Cr: 10.0 to 20.0%;
Ni: 0.01 to 1.0%;
Ti: 0.10 to 0.30%;
V: 0.01 to 0.40%;
Al: 0.005 to 0.3%;
N: 0.001 to 0.02%;
B: 0 to 0.0030%;
Mo: 0 to 2.0%;
Cu: 0 to 0.3%;
Mg: 0 to 0.0030%;
Sn: 0 to 0.1%;
Sb: 0 to 0.1%;
Zr: 0 to 0.1%;
Ta: 0 to 0.1%;
Nb: 0 to 0.1%;
Hf: 0 to 0.1%;
W: 0 to 0.1%;
Co: 0 to 0.2%;
Ca: 0 to 0.0030%;
REM: 0 to 0.05%; and
Ga: 0 to 0.1%,
with the balance being Fe and unavoidable impurities, wherein
in a steel micro-structure, on a cross section parallel to a rolling direction, an area ratio of structures each satisfying: major grain diameter/minor grain diameter being 5.0 or more is 90% or more, and an average minor grain diameter of the structures is 100 μm or less.

(2) A hot coil made of the ferritic stainless steel sheet according to the above (1).

(3) An automobile exhaust flange member made of the ferritic stainless steel sheet according to the above (1).

(4) An automobile exhaust flange member made using the ferritic stainless hot coil according to the above (2).

Advantageous Effects of Invention

According to the present invention, it is possible to provide efficiently a ferritic stainless steel sheet excellent in toughness. The ferritic stainless steel sheet is particularly suitable to an automobile exhaust flange member.

DESCRIPTION OF EMBODIMENTS

1. Chemical Composition

C: 0.001 to 0.010%

C (carbon) degrades toughness through hardening brought by dissolved C and through precipitation in a form of carbides; therefore, the smaller a content of C is, the better it is. An excessive content of C causes deterioration in toughness attributable to the formation of the carbides; therefore, an upper limit of the content of C is set at 0.010%. Excessive reduction in C however leads to increase in refining costs; therefore, a lower limit of the content of C is set at 0.001%. In addition, in consideration of production costs, corrosion resistance, and a toughness of the steel sheet, the lower limit may be set at 0.002% or 0.003%, and the upper limit may be set at 0.009%, 0.008%, or 0.007%.

Si: 0.01 to 1.0%

Si (silicon) may be added as a deoxidizing element and, in addition, enhances oxidation resistance; however, from a viewpoint of toughness; the smaller a content of Si is, the better it is because Si is a solid-solution strengthening element. An excessive content of Si causes significant deterioration in toughness, and therefore, an upper limit of the content of Si is set at 1.0%. Meanwhile, to ensure an oxidation resistance, a lower limit of the content of Si is set at 0.01%. Excessive reduction in Si however leads to increase in refining costs; therefore, in consideration of material quality, initial rust resistance, and the like, the lower limit may be set at 0.05, 0.10%, or 0.15%, and the upper limit may be set at 0.9%, 0.8%, 0.7%, or 0.6%.

Mn: 0.01 to 1.0%

Mn (manganese) is, as with Si, a solid-solution strengthening element, and therefore, in consideration of material quality, the smaller a content of Mn is, the better it is. In particular, an excessive content of Mn delays recrystallization caused by precipitation of y phases during hot rolling, which may degrade toughness; therefore, an upper limit of a content of Mn is set at 1.0%. Meanwhile, excessive reduction in Mn leads to increase in refining costs, and in addition, addition of a minute quantity of Mn enhances scale peeling property; therefore, a lower limit of the content of Mn is set at 0.01%. In addition, in consideration of material quality, production costs, and the like, the lower limit may be set at 0.1%, 0.2%, 0.25%, or 0.3%, and the upper limit may be set at 0.7%, 0.6%, 0.5%, or 0.4%.

P: 0.04% or less

P (phosphorus) is an element that is mixed in the steel sheet in a form of an unavoidable impurity from raw material, such as ferrochrome, and has a solid-solution strengthening capability stronger than those of Mn and Si. For a purpose of hardening a material, the smaller a content of P is, the better it is, from a viewpoint of toughness. An excessive content of P causes embrittlement attributable to grain-boundary segregation of P; therefore, an upper limit of the content of P is set at 0.04%. A lower limit of the content of P is not needed to be determined particularly and is 0%. Excessive reduction in P however leads to increase in raw-material costs, and therefore a lower limit of the content of P may be set at 0.005%, 0.01%, or 0.015%. In addition, in consideration of corrosion resistance, the upper limit may be set at 0.03%, 0.025%, or 0.02%.

S: 0.010% or less

S (sulfur) is also an element mixed in the steel sheet in a form of an unavoidable impurity and degrades corrosion resistance; therefore, the smaller a content of S is, the better it is. An excessive content of S tends to delay recrystallization in rough hot rolling attributable to formation of precipitations such as MnS, $Ti_4C_2S_2$; therefore, an upper limit of the content of S is set at 0.010%. A lower limit of the content of S is not needed to be determined particularly and is 0%. S, however, combines with Mn or Ti to exert an effect of enhancement in punching property in flange forming. To obtain this effect, a lower limit of the content of S may be set at 0.0002%, 0.0005%, or 0.001%. In addition, in consideration of inhibition of crevice corrosion when the steel sheet is used as a fuel-system part, the upper limit may be set at 0.008%, 0.006%, or 0.005%.

Cr: 10.0 to 20.0%

Cr (chromium) is an element that enhances corrosion resistance and oxidation resistance, and in consideration of a salt corrosion resistance required of a flange, it is necessary to contain Cr at 10.0% or more. Meanwhile, an excessive content of Cr makes the steel sheet hard, degrading formability and toughness. In addition, Cr tends to delay recrystallization in rough hot rolling in a form of dissolved Cr, and when a content of Cr is more than 20.0%, unrecrystallized structures remains immediately before finish hot rolling to degrade toughness of the steel sheet; therefore, an upper limit of the content of Cr is set at 20.0%. In consideration of production costs, breakage of the steel sheet in production due to deterioration in toughness, and the like, a lower limit of the content of Cr may be set at 11.0%, 12.0%, or 13.0%. The upper limit may be set at 19.0%, 18.0%, or 17.0%

Ni: 0.01 to 1.0%

Ni (nickel) inhibits crevice corrosion, and enhances initial rust resistance by promoting repassivation; therefore 0.01% or more of Ni is contained. An excessive content of Ni however leads to hardening, degrading formability, and promotes precipitation of austenite phases during hot rolling, delaying recrystallization during rough hot rolling, and in addition, causes stress corrosion cracking to occur easily; therefore, an upper limit of a content of Ni is set at 1.0%. In addition, in consideration of raw-material costs and the like, a lower limit of the content of Ni may be set at 0.02%, 0.03%, or 0.05%, and the upper limit may be set at 0.5%, 0.3%, 0.2%, or 0.1%.

Ti: 0.10 to 0.30%

Ti (titanium) is an element that is added to enhance corrosion resistance, intergranular corrosion resistance, and toughness by combining with C, N, S, and P. In particular, if C and N are not immobilized sufficiently, sensitization occurs to form a Cr depleted zone, resulting in a significant deterioration in corrosion resistance; therefore, a lower limit of a content of Ti is 0.10%.

To ensure a corrosion resistance of the steel sheet as well as its weld zone, the lower limit may be set at 0.12%, 0.14%, or 0.16%. Meanwhile, an excessive content of Ti causes coarse TiN to precipitate in molten steel in a steelmaking process, degrading a toughness of the steel sheet; therefore, an upper limit of the content of Ti is set at 0.30%. In consideration of production costs and the like, the upper limit may be set at 0.28%, 0.25%, or 0.22%

V: 0.01 to 0.40%

V (vanadium) inhibits crevice corrosion, and in addition, contributes to enhancement in toughness when added in minute quantity; therefore 0.01% or more of V is contained. An excessive content of V however leads to hardening, degrading formability, and in addition, causes coarse V(C, N) to precipitate, causing deterioration in toughness; therefore, an upper limit of a content of V is set at 0.4%. In consideration of the enhancement in toughness, raw-material costs, initial rust resistance, and the like, a lower limit of the content of V may be set at 0.02%, 0.03%, or 0.04%, and the upper limit may be set at 0.20%, 0.10%, or 0.06%.

Al: 0.005 to 0.3%

Al (aluminum) is an element added as a deoxidizing element and enhances a toughness of the steel sheet by reducing oxides in the steel. Al exerts the action when a content of Al is 0.005% or more, and therefore, a lower limit of the content of Al is set at 0.005%. An excessive content of Al causes deterioration in toughness and degradation in weldability and surface quality, and in addition delays recrystallization in rough hot rolling; therefore, an upper limit of the content of Al is 0.3%. In addition, in consideration of refining costs and the like, the lower limit may be set at 0.01%, 0.02%, or 0.03%, and the upper limit may be set at 0.15%, 0.1%, 0.08%, or 0.06%.

N: 0.001 to 0.02%

N (nitrogen) degrades toughness and corrosion resistance as with C, and the smaller a content of N is, the better it is. An excessive content of N causes deterioration in toughness attributable to formation of coarse nitrides, which brings about a situation where improvement in toughness cannot be achieved only by refining grain sizes; therefore, an upper limit of the content of N is set at 0.02%. Excessive decrease in N however leads to increase in refining costs; therefore, a lower limit of the content of N is set at 0.001%. In addition, in consideration of production costs, workability, initial rust resistance, and the like, a lower limit of the content of N may be set at 0.003%, 0.005%, or 0.006%, and the upper limit may be set at 0.015%, 0.010%, or 0.009%.

Although N is preferably reduced from a viewpoint of enhancing a toughness of a ferritic stainless steel, it is also useful, from a viewpoint of corrosion resistance, oxidation resistance, pressing formability, and reducing hot rolling flaws, to add a proper amount of at least one of B, Mo, Cu, Mg, Sn, Sb, Zr, Ta, Nb, W, Co, Ca, REM, Ga, and Bi.

B: 0 to 0.0030%

B (boron) is an element that enhances secondary metal workability of a product by segregating in grain boundaries and therefore may be contained to enhance a punching property of a flange. An excessive content of B however causes borides to precipitate, degrading toughness, and in addition, delays recrystallization during rough hot rolling; therefore, an upper limit of a content of B is set at 0.0030%. A lower limit of the content of B is not needed to be determined particularly and is 0%. For enhancement in toughness and the like, the lower limit may be set at 0.0001% or 0.0002%. In consideration of costs and deterioration in ductility, the upper limit may be set at 0.0020%, 0.0010%, or 0.0005%.

Mo: 0 to 2.0%

Mo (molybdenum) is an element that enhances corrosion resistance and high-temperature strength, and in particular, in a case of having a crevice structure, Mo may be contained to inhibit crevice corrosion. An excessive content of Mo increases oxidation resistance significantly, causing a flow during heating for hot rolling due to breakaway oxidation, and delays recrystallization in rough hot rolling to coarsen rough-hot-rolled structure, causing deterioration in toughness; therefore, an upper limit of a content of Mo is set at 2.0%. A lower limit of the content of Mo is not needed to be determined particularly and is 0%. For enhancement in toughness and the like, 0.01% of Mo may be contained. In addition, in consideration of production costs and the like, the lower limit may be set at 0.02% or 0.03%, and the upper limit may be set at 1.2%, 0.3%, or 0.1%.

Cu: 0 to 0.3%

Cu (copper) may be contained because Cu enhances high-temperature strength, and in addition, inhibits crevice corrosion and promotes repassivation. An excessive content of Cu leads to hardening by precipitation of ε-Cu and Cu-rich clusters, degrading formability and toughness; therefore, an upper limit of a content of Cu is set at 0.3%. A lower limit of the content of Cu is not needed to be determined particularly and is 0%. For enhancement in formability and toughness, 0.01% or more of Cu may be contained. In consideration of pickling property in production, the lower limit may be set at 0.01% or 0.03%, and the upper limit may be set at 0.02%, 0.12%, or 0.10%.

Mg: 0 to 0.0030%

Mg (magnesium) is in some cases added as a deoxidizing element and in addition, is an element that contributes to enhancement in formability by refining structures of a slab. In addition, a Mg oxide serves as a precipitation site for carbo-nitrides such as Ti(C, N) and Nb(C, N) and has an effect of fine dispersing precipitation of these carbo-nitrides. For that reason, Mg may be contained. An excessive content of Mg however leads to deterioration in weldability and corrosion resistance; therefore, an upper limit of a content of Mg is set at 0.0030%. A lower limit of the content of Mg is not needed to be determined particularly and is 0%. The lower limit may be set at 0.0003%, 0.0006%, or 0.01% as necessary. In consideration of refining costs and the like, the upper limit may be set at 0.0020% or 0.0010%.

Sn: 0 to 0.1%

Sb: 0 to 0.1%

Sn (tin) and Sb (antimony) may be contained because Sn and Sb contribute to enhancement in corrosion resistance and high temperature strength. Excessive contents of Sn and Sb cause slab cracking in production of the steel sheet, and in addition, cause deterioration in a toughness of the steel sheet; therefore, upper limits of contents of Sn and Sb are set at 0.1%. Lower limits of contents of Sn and Sb are not needed to be determined particularly and are 0%. The lower limits may be set at 0.005% or 0.01% as necessary. In addition, in consideration of refining costs, producibility, and the like, the upper limits may be set at 0.05% or 0.02%.

Zr: 0 to 0.1%

Ta: 0 to 0.1%

Nb: 0 to 0.1%

Hf: 0 to 0.1%

Zr (zirconium), Ta (tantalum), Nb (niobium), or Hf (hafnium) may be contained because Zr, Ta, Nb, and Hf combine C and N to contribute to enhancement in toughness. Excessive contents of Zr, Ta, Nb, and Hf however increase costs and in addition, cause large carbo-nitrides to precipitate, degrading a toughness of the steel sheet significantly; therefore, upper limits of contents of Zr, Ta, Nb, and Hf are set at 0.1%. Lower limits of contents of Zr, Ta, Nb, and Hf are not needed to be determined particularly and are 0%. The lower limits may be set at 0.005% or 0.01% as necessary. In addition, in consideration of refining costs, producibility, and the like, the upper limits may be set at 0.08% or 0.03%.

W: 0 to 0.1%

As with Mo, W (tungsten) may be contained because W contributes to enhancement in corrosion resistance and high temperature strength. An excessive content of W leads to deterioration in toughness and increase in costs in production of the steel sheet; therefore, an upper limit of a content of W is set at 0.1%. A lower limit of the content of W is not needed to be determined particularly and is 0%. The lower limit may be set at 0.01% as necessary. In consideration of refining costs, producibility, and the like, the upper limit may be set at 0.05% or 0.02%.

Co: 0 to 0.2%

Co (cobalt) may be contained because Co contributes to enhancement in high temperature strength. An excessive content of Co causes deterioration in toughness due to solid-solution strengthening or inhibit of recrystallization during rough hot rolling; therefore, an upper limit of a content of Co is set at 0.2%. A lower limit of the content of Co is not needed to be determined particularly and is 0%. To obtain this effect, the lower limit may be set at 0.01%, 0.02%, or 0.04%. In addition, in consideration of refining costs, producibility, and the like, the upper limit may be set at 0.15% or 0.1%.

Ca: 0 to 0.0030%

Ca (calcium) may be contained because Ca has a desulfurizing effect. An excessive content of Ca however causes formation of coarse CaS, degrading corrosion resistance; therefore, an upper limit of a content of Ca is set at 0.0030%. A lower limit of the content of Ca is not needed to be determined particularly and is 0%. In consideration of refining costs, producibility, and the like, the upper limit may be set at 0.0030% or 0.0020%.

REM: 0 to 0.05%

REM may be contained because REM has an effect of enhancing toughness by refining various precipitates and has an effect of enhancing oxidation resistance. An excessive content of REM however makes castability significantly poor and in addition, degrades toughness through solid-solution strengthening and by inhibiting recrystallization in rough hot rolling; therefore, an upper limit of a content of REM is set at 0.05%. A lower limit of the content of REM is not needed to be determined particularly and is 0%. To obtain this effect, the lower limit may be set at 0.001% or 0.002%. In addition, in consideration of refining costs, producibility, and the like, the upper limit may be set at 0.01% or 0.005%. According to a common definition, REM (rare earth metal) refers to a generic term for 2 elements, scandium (Sc), yttrium (Y), and 15 elements (lanthanoid), from lantern (La) through lutetium (Lu). One element of REM may be added, or mixture of elements of REM may be added.

Ga: 0 to 0.1%

Ga (gallium) may be contained at a content within a range of 0.1% or less for enhancement in corrosion resistance and inhibition of hydrogen embrittlement. A lower limit of a content of Ga is not needed to be determined particularly and is 0%. The lower limit may be set at 0.0002% as necessary, from a viewpoint of formation of its sulfide and its hydride. An upper limit of the content of Ga may be set at 0.0020% from a viewpoint of producibility and costs and a viewpoint of promotion of recrystallization in rough hot rolling.

Components other than those described above are not specifically defined in the present invention, but in the present invention, 0.001 to 0.1% of Bi or the like may be contained as needed. Note that commonly harmful elements and impurity elements such as As and Pb are preferably reduced as much as possible.

2. Steel Micro-Structure

In a steel micro-structure of the ferritic stainless steel sheet according to the present invention, an area ratio of structures each satisfying: major grain diameter/minor grain diameter being 5.0 or more is 90% or more in a cross section of the steel sheet parallel to a rolling direction. The area ratio of the structures each satisfying: major grain diameter/minor grain diameter being 5.0 or more being 90% or more means that the ferritic stainless steel sheet according to the present invention is a steel sheet as it is after hot rolling. The area ratio of the above structures is preferably made as high as possible. A lower limit of the area ratio may be set at 91%, 92%, or 93% as necessary. An upper limit of the area ratio is 100% but may be set at 99% or 98%. Here, measurement of the steel micro-structure is performed in such a manner that grain boundaries are exposed on a cross section of the steel sheet parallel to the rolling direction and a sheet-thickness direction by nitric-acid electrolytic etching, a zone having at least 1 mm$^2$ is observed under an optical microscope at positions of 0.25 t (t: sheet thickness) and 0.50 t (t:

sheet thickness), and an area fraction of grains each of which a ratio of a major grain diameter and a minor grain diameter (major grain diameter/minor grain diameter) is 5.0 or more is measured. A reference of the structures each having a major grain diameter/minor grain diameter being 5.0 or more is that an average value of the area fraction at the 0.25 t position and the 0.50 t position is 90% or more.

An average minor grain diameter of the ferritic stainless steel sheet according to the present invention is 100 μm or less. Here, an average minor grain diameter at 0.25 t to 0.75 t (t: plate thickness) is used as a reference. Specifically, the "average minor grain diameter" is determined in such a manner that grain boundaries are exposed on the cross section of the steel sheet parallel to the rolling direction and the sheet-thickness direction by nitric-acid electrolytic etching, and a line parallel to the sheet thickness direction is observed within a range of 0.25 t to 0.75 t (t: sheet thickness), a number of grains captured on the line is measured to JIS G0551 Appendix C.2, and an actual length of the length is divided by the number of grains.

Figure 2:
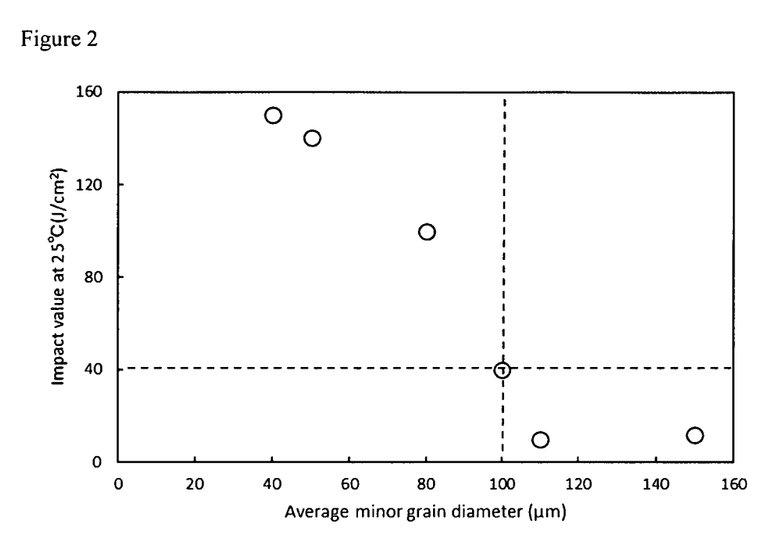
FIG. 2 is a graph illustrating influences of average minor grain diameter on Charpy impact value at 25° C.

As illustrated in FIG. 2, an average minor grain diameter being more than 100 μm yields a low Charpy impact value at 25° C. However, an average minor grain diameter being 100 μm or less increases a Charpy impact value at 25° C. to 40 J/cm$^2$ or more, results in enhancement in a toughness of the steel sheet. At this point, even if coarse, elongated and expanded grains that are unrecrystallized during rough hot rolling remain partially, a toughness required for the steel sheet is ensured by fine, elongated and expanded ferrite grains surrounding the coarse, elongated and expanded grains. For that reason, an upper limit of the average minor grain diameter is set at 100 μm. For enhancement in toughness, the upper limit may be set at 95 μm, 90 μm, 85 μm, 80 μm, or 78 μm. In contrast, when severe plastic deformation at low temperature is performed to refine structures, galling is likely to be caused between the steel sheet and a rolling work roll in the hot rolling, which also limits the refining of the structures; therefore, a lower limit of the average minor grain diameter may be set at 30 μm. The lower limit may be set at 40 μm, 47 μm, 51 μm, 55 μm, or 60 μm as necessary.

3. Producing Method

The steel sheet according to the present invention is produced by a steelmaking process and hot rolling.

There is no special limitation on the steelmaking process. For example, a preferable method is one in which steels having the chemical composition described above is melted in a converter, followed by second refining. The melted molten steel is formed into slabs in conformity with a known casting method (continuous casting). The slabs are heated to a predetermined temperature and subjected to hot rolling by continuous rolling, so as to have a predetermined sheet thickness.

The hot rolling process is a particularly important process to obtain the steel micro-structure according to the present invention. The present inventors have confirmed through previously conducted studies that the steel micro-structure according to the present inventors can be obtained in a case where the following recommended conditions are satisfied.

(a) Heating Temperature: 940 to 990° C.

To make rough-hot-rolled structures fine, a heating temperature needs to be lowered and is set at 990° C. or less. An excessively low heating temperature however may cause hot rolling flaws; therefore, the heating temperature is set at 940° C. or more.

(b) Rough-Hot-Rolling Entrance-Side Temperature: 900 to 950° C.

By setting an entrance side temperature in rough hot rolling at 950° C. or less, the rough-hot-rolled structures can be refined. Even when the heating temperature is high, a rough-hot-rolling starting temperature can be lowered by cooling a slab by a time of the rough hot rolling. However, excessively lowering the entrance-side temperature causes hot rolling flaws; therefore, the entrance-side temperature is set at 900° C. or more.

(c) Rough-Hot-Rolling Ending Temperature: 850 to 900° C.

When a rough-hot-rolling ending temperature is more than 900° C., rough-hot-rolled structures are coarsened. In contrast, when the rough-hot-rolled ending temperature falls below 850° C., recrystallization after the rough hot rolling is delayed, which coarsens the rough-hot-rolled structures (structures immediately before finish hot rolling), degrading a toughness of a hot-rolled sheet after the finish hot rolling. For that reason, the rough-hot-rolling ending temperature is set at 850 to 900° C. Note that the rough-hot-rolling ending temperature is substantially determined depending on the rough hot rolling starting temperature. However, the rough-hot-rolling ending temperature can be lowered by increasing a number of passes of the rough hot rolling or increasing a rolling reduction of the rough hot rolling.

(d) Rough Rolling Reduction: 80% or More

By setting a rolling reduction of the rough hot rolling at 80% or more, the rough-hot-rolled structures can be refined. An upper limit of the rolling reduction of the rough hot rolling are not needed to be determined specifically, but in actual production, the rolling reduction seldom becomes more than 95%; therefore, the upper limit may be set at 95%.

(e) Bar Heater: Temperature Rise of 30° C. or More

The rough hot rolling is performed as reversible rolling, and finish hot rolling is performed as unidirectional rolling using a tandem hot rolling mill. For that reason, a rough hot rolling mill and a finish hot rolling mill are separated from each other by a space of about 100 m, through which a temperature of a sheet bar decreases greatly. If the decrease in temperature occurring in the space is excessive, a load of the finish hot rolling becomes heavy, which makes quality unstable and in addition, fails to bring the steel micro-structure into a desired state. Moreover, the excessive decrease in temperature increases a ratio of unrecrystallized structures, increasing an average grain size. For that reason, a finish-hot-rolling starting temperature of a hot-rolled coil needs to be uniform in a longitudinal direction of the coil. It is therefore important to use a bar heater of an induction system to heat a sheet bar (rough bar). It is necessary for a ferritic stainless steel not to experience phase transformation and to refine solidification structures of a slab through recrystallization after the rough hot rolling; however, in order to perform the recrystallization by means of strains brought by the rough hot rolling, using a bar heater to prevent the decrease in temperature after the rough hot rolling is effective. Specifically, the bar heater is used to bring about a temperature rise of 30° C. or more. In contrast, an excessive temperature rise causes grain growth coarsening the rough-hot-rolled structures; therefore, the temperature rise is preferably set at 55° C. or less.

(f) Heat Insulation Cover: Heat Conservation

Similarly to using the bar heater, as a method to inhibit the decrease in temperature of the sheet bar, heat insulation covers are provided on surfaces sandwiching vertically a conveyance table provided between the rough hot rolling and the finish hot rolling to perform heat conservation, by which structure refining through recrystallization is intended.

(g) Finish-Hot-Rolling Entrance-Side Temperature: 840 to 890° C.

In a finish hot rolling process, a sheet bar having a sheet thickness of 28 to 38 mm is rolled to have a required hot-rolled sheet thickness, so that rough-hot-rolled structures are elongated and expanded, by which strains are accumulated. In this process, by accumulating strains in a large amount, a toughness of a hot-rolled sheet can be enhanced. To accumulate the strains (increase a dislocation density), a rolling starting temperature is set at 890° C. or less, but an excessively lowered rolling starting temperature causes hot rolling flaws. For that reason, a finish-hot-rolling entrance-side temperature is set at 840 to 890° C.

(h) Finish-Hot-Rolling Ending Temperature: 690 to 740° C.

Similarly to the finish-hot-rolling starting temperature, when a finish-hot-rolling ending temperature is lowered, strains are accumulated, increasing toughness, but an excessively lowered finish-hot-rolling ending temperature causes hot rolling flaws. The cause of hot rolling flaws described herein is mainly galling between the hot rolling work roll and the hot-rolled sheet. For that reason, the finish-hot-rolling ending temperature is set at 690 to 740° C. Note that the finish-hot-rolling ending temperature is determined in conjunction with the finish-hot-rolling starting temperature starting temperature but is changed depending on a rolling speed and the sheet thickness.

(i) Finish Rolling Reduction: 60% or More

By setting a rolling reduction of the finish rolling at 60% or more, the rough-hot-rolled structures can be refined. An upper limit of the rolling reduction of the finish rolling does not be determined specifically, but in actual production, the rolling reduction seldom becomes more than 95%; therefore, the upper limit may be set at 95%.

(j) Allowed Period to Start Water Cooling: within 2 Seconds

Since a ferritic stainless steel does not experience phase transformation, structures after the rough hot rolling is elongated and expanded grains that are recrystallized grains produced by the rough hot rolling are elongated and expanded by the finish hot rolling. In order for the strains accumulated in the finish hot rolling not to decrease due to recovery or recrystallization, the steel sheet is cooled immediately after the finish hot rolling. A period from an end of the finish hot rolling to a start of water cooling is set at a period within 2 seconds.

(k) Cooling Rate: 25° C./s or More

After the finish hot rolling, the hot-rolled sheet needs to be cooled to an intended coiling temperature. The hot-rolled sheet needs to be cooled to the intended coiling temperature between a final stand of the finish hot rolling to a coiling machine (coiler). At this point, the cooling is performed at a cooling rate of 25° C./s or more.

(1) Water Cooling Ending Temperature: 510 to 560° C.

To control the coiling temperature, it is necessary to measure a temperature of a hot-rolled sheet online using a radiation thermometer or the like; however, when the temperature of the sheet decreases to about 450° C., water on a top of the sheet does not evaporate but remain until the sheet reaches the coiler, which makes it difficult to measure the temperature of the sheet; therefore, a water cooling ending temperature is set at 510° C. or more. In order to decrease the coiling temperature to 550° C. or less, the water cooling ending temperature is set at 560° C. or less.

(m) Coiling Temperature: 500 to 550° C.

When the coiling temperature is excessively high, the strains introduced in the finish hot rolling may decrease through recovery or recrystallization, or precipitates such as FeTiP may precipitate to degrade toughness. For that reason, the coiling temperature is set at 550° C. or less. However, when the coiling temperature is excessively low, the measurement and control of the temperature becomes difficult; therefore, the coiling temperature is set at 500° C. or more.

The hot-rolled coil produced according to the present invention dispenses with cooling the whole coil in a water tank, which simplify the producing process. The thickness of the hot-rolled steel sheet is set at 5 to 12 mm or less, which is employed frequently for flanges, but when the steel sheet is thickened excessively, a toughness of the steel sheet deteriorates extremely; therefore, the thickness is desirably 5 to 10 mm.

Through pickling, skin-pass rolling, or surface grinding after the hot rolling, the hot-rolled steel sheet can be made suitable for a flange.

EXAMPLE

Steels having chemical compositions shown in Table 1 were melted, cast into slabs, and the slabs are subjected to the hot rolling coil to 5 to 15 mm to be formed into hot-rolled coils. Conditions for the production are shown in Table 2 and Table 3.

TABLE 1

| Steel No. | Chemical Composition (mass %, Balance: Fe and unavoidable impurities) | | | | | | | | | | | |
|---|---|---|---|---|---|---|---|---|---|---|---|---|
| | C | Si | Mn | P | S | Cr | Ni | Ti | V | Al | N | Others |
| 1 | 0.005 | 0.45 | 0.35 | 0.027 | 0.001 | 11.1 | 0.02 | 0.20 | 0.03 | 0.02 | 0.008 | |
| 2 | 0.005 | 0.12 | 0.35 | 0.025 | 0.001 | 17.1 | 0.01 | 0.18 | 0.04 | 0.02 | 0.006 | 0.0002% B |
| 3 | 0.004 | 0.13 | 0.45 | 0.027 | 0.002 | 17.3 | 0.01 | 0.21 | 0.04 | 0.02 | 0.008 | 0.5% Mo |
| 4 | 0.002 | 0.45 | 0.35 | 0.027 | 0.001 | 17.3 | 0.02 | 0.20 | 0.02 | 0.05 | 0.008 | 0.01% Sn, 0.01% Sb |
| 5 | 0.004 | 0.62 | 0.35 | 0.017 | 0.002 | 17.3 | 0.02 | 0.21 | 0.02 | 0.05 | 0.008 | 0.01% Co |
| 6 | 0.004 | 0.44 | 0.01 | 0.027 | 0.001 | 17.4 | 0.02 | 0.18 | 0.05 | 0.03 | 0.012 | 0.01% Cu, 0.1% Sb |
| 7 | 0.005 | 0.42 | 1.00 | 0.020 | 0.001 | 17.3 | 0.30 | 0.21 | 0.01 | 0.04 | 0.006 | 0.1% Sn |
| 8 | 0.004 | 0.12 | 0.12 | 0.010 | 0.002 | 17.2 | 0.02 | 0.22 | 0.02 | 0.03 | 0.001 | 1.2% Mo |
| 9 | 0.002 | 0.11 | 0.45 | 0.040 | 0.001 | 17.3 | 0.01 | 0.23 | 0.05 | 0.05 | 0.007 | 0.3% Cu, 0.01% W |
| 10 | 0.005 | 0.01 | 0.12 | 0.026 | 0.0002 | 17.5 | 0.01 | 0.20 | 0.05 | 0.05 | 0.007 | 2.0% Mo |
| 11 | 0.003 | 0.45 | 0.35 | 0.027 | 0.01 | 17.3 | 0.02 | 0.20 | 0.04 | 0.04 | 0.006 | 0.0030% B |
| 12 | 0.010 | 0.12 | 0.12 | 0.030 | 0.001 | 10.0 | 0.07 | 0.22 | 0.05 | 0.04 | 0.020 | 0.0002% Mg, 0.1% Zr |
| 13 | 0.006 | 0.10 | 0.12 | 0.027 | 0.002 | 20.0 | 0.30 | 0.10 | 0.03 | 0.04 | 0.008 | 0.0030% Mg, 0.1% Hf, 0.1% Ta, 0.1% W |
| 14 | 0.001 | 0.90 | 0.35 | 0.025 | 0.003 | 17.4 | 0.02 | 0.10 | 0.04 | 0.04 | 0.006 | 0.0002% Ga, 0.1% W |
| 15 | 0.004 | 0.10 | 0.35 | 0.027 | 0.001 | 13.5 | 0.02 | 0.30 | 0.03 | 0.03 | 0.008 | 0.1% Co, 0.0030% Ca, 0.001% REM |

TABLE 1-continued

| Steel No. | \multicolumn{11}{c}{Chemical Composition (mass %, Balance: Fe and unavoidable impurities)} |
|---|---|---|---|---|---|---|---|---|---|---|---|---|
| | C | Si | Mn | P | S | Cr | Ni | Ti | V | Al | N | Others |
| 16 | 0.005 | 1.00 | 0.10 | 0.025 | 0.002 | 17.3 | 0.08 | 0.20 | 0.02 | 0.05 | 0.006 | 0.0001% Ca, 0.1% Ga |
| 17 | 0.004 | 0.11 | 0.35 | 0.025 | 0.004 | 17.5 | 0.11 | 0.10 | 0.40 | 0.05 | 0.007 | 0.01% Zr, 0.01% Ta |
| 18 | 0.005 | 0.12 | 0.36 | 0.027 | 0.001 | 16.5 | 0.02 | 0.20 | 0.05 | 0.005 | 0.0012 | |
| 19 | 0.005 | 0.46 | 0.10 | 0.029 | 0.001 | 18.1 | 0.01 | 0.40 | 0.03 | 0.30 | 0.007 | 0.01% Hf, 0.01% Nb |
| 20 | 0.004 | 0.20 | 0.13 | 0.025 | 0.001 | 17.2 | 0.02 | 0.21 | 0.05 | 0.05 | 0.006 | 0.05% REM |
| 21 | 0.012* | 0.45 | 0.25 | 0.027 | 0.001 | 16.5 | 0.03 | 0.19 | 0.05 | 0.04 | 0.014 | |
| 22 | 0.003 | 1.10* | 0.45 | 0.026 | 0.001 | 17.2 | 0.01 | 0.18 | 0.03 | 0.03 | 0.008 | |
| 23 | 0.004 | 0.45 | 1.10* | 0.027 | 0.001 | 17.2 | 0.02 | 0.17 | 0.05 | 0.05 | 0.008 | |
| 24 | 0.005 | 0.12 | 0.35 | 0.041* | 0.001 | 18.1 | 0.01 | 0.21 | 0.03 | 0.03 | 0.006 | |
| 25 | 0.006 | 0.15 | 0.12 | 0.027 | 0.011* | 17.5 | 0.02 | 0.18 | 0.05 | 0.04 | 0.008 | |
| 26 | 0.002 | 0.13 | 0.12 | 0.025 | 0.003 | 20.2* | 0.02 | 0.25 | 0.03 | 0.05 | 0.008 | |
| 27 | 0.004 | 0.14 | 0.24 | 0.025 | 0.001 | 17.1 | 1.10* | 0.20 | 0.05 | 0.03 | 0.006 | |
| 28 | 0.003 | 0.08 | 0.45 | 0.027 | 0.002 | 13.2 | 0.02 | 0.45* | 0.03 | 0.04 | 0.007 | |
| 29 | 0.002 | 0.45 | 0.23 | 0.025 | 0.003 | 17.5 | 0.01 | 0.20 | 0.50* | 0.03 | 0.006 | |
| 30 | 0.004 | 0.12 | 0.80 | 0.027 | 0.002 | 17.2 | 0.02 | 0.25 | 0.05 | 0.5* | 0.006 | |
| 31 | 0.003 | 0.13 | 0.21 | 0.025 | 0.001 | 17.2 | 0.01 | 0.21 | 0.03 | 0.03 | 0.025* | |
| 32 | 0.005 | 0.11 | 0.11 | 0.027 | 0.003 | 9.5* | 0.01 | 0.21 | 0.03 | 0.04 | 0.007 | 0.0040% B* |
| 33 | 0.004 | 0.20 | 0.21 | 0.025 | 0.001 | 16.5 | 0.01 | 0.22 | 0.05 | 0.03 | 0.008 | 0.0050% Mg* |
| 34 | 0.004 | 0.11 | 0.24 | 0.027 | 0.001 | 17.2 | 0.01 | 0.20 | 0.03 | 0.04 | 0.007 | 0.2% Sn* |
| 35 | 0.004 | 0.11 | 0.00* | 0.024 | 0.003 | 18.0 | 0.01 | 0.26 | 0.05 | 0.02 | 0.008 | 0.2% Sb* |
| 36 | 0.004 | 0.10 | 0.12 | 0.025 | 0.001 | 17.2 | 0.01 | 0.20 | 0.00* | 0.05 | 0.008 | 0.2% Zr* |
| 37 | 0.006 | 0.30 | 0.25 | 0.024 | 0.001 | 17.2 | 0.01 | 0.22 | 0.05 | 0.04 | 0.007 | 0.2% Ta* |
| 38 | 0.003 | 0.00* | 0.13 | 0.025 | 0.001 | 17.2 | 0.01 | 0.18 | 0.05 | 0.03 | 0.008 | 0.2% Hf* |
| 39 | 0.005 | 0.10 | 0.21 | 0.027 | 0.001 | 14.1 | 0.00* | 0.19 | 0.03 | 0.05 | 0.006 | 2.5% W* |
| 40 | 0.007 | 0.24 | 0.22 | 0.026 | 0.002 | 17.3 | 0.01 | 0.21 | 0.05 | 0.04 | 0.007 | 0.2% Co* |
| 41 | 0.003 | 0.12 | 0.13 | 0.025 | 0.001 | 17.2 | 0.01 | 0.08* | 0.03 | 0.03 | 0.006 | 0.0050% Ca* |
| 42 | 0.003 | 0.23 | 0.21 | 0.025 | 0.002 | 17.5 | 0.01 | 0.18 | 0.05 | 0.002* | 0.008 | 0.1% REM* |
| 43 | 0.004 | 0.20 | 0.11 | 0.027 | 0.001 | 17.2 | 0.02 | 0.18 | 0.03 | 0.05 | 0.008 | 0.2% Ga* |
| 44 | 0.004 | 1.00 | 0.35 | 0.026 | 0.001 | 17.3 | 0.02 | 0.21 | 0.01 | 0.05 | 0.008 | |

The mark "*" indicates that the value fell out of the range defined in the present invention.

TABLE 2

| | | | | ROUGH ROLLING | | | | ROUGH ROLLING TO FINISH ROLLING | | |
|---|---|---|---|---|---|---|---|---|---|---|
| RUN NUMBER | | Steel No. | SLAB THICKNESS (mm) | HEATING TEMPERATURE (° C.) | STARTING TEMPERATURE (° C.) | ENDING TEMPERATURE (° C.) | ROLLING REDUCTION (%) | TEMPERATURE RISE BY BAR HEATER (Y/N) | TEMPERATURE RISE (° C.) | HEAT CONSERVATION COVER (Y/N) |
| INVENTIVE EXAMPLE | 1 | 1 | 250 | 980 | 950 | 850 | 88 | Y | 50 | Y |
| | 2 | 2 | 252 | 990 | 950 | 850 | 87 | Y | 50 | Y |
| | 3 | 3 | 248 | 940 | 900 | 850 | 89 | Y | 50 | Y |
| | 4 | 4 | 252 | 970 | 940 | 850 | 88 | Y | 50 | Y |
| | 5 | 5 | 250 | 950 | 920 | 850 | 86 | Y | 50 | Y |
| | 6 | 6 | 200 | 980 | 950 | 850 | 86 | Y | 30 | Y |
| | 7 | 7 | 220 | 980 | 950 | 850 | 86 | Y | 40 | Y |
| | 8 | 8 | 250 | 980 | 950 | 850 | 89 | Y | 50 | Y |
| | 9 | 9 | 252 | 980 | 950 | 850 | 89 | Y | 50 | Y |
| | 10 | 10 | 252 | 990 | 950 | 850 | 88 | Y | 50 | Y |
| | 11 | 11 | 252 | 970 | 940 | 850 | 87 | Y | 50 | Y |
| | 12 | 12 | 252 | 980 | 950 | 850 | 89 | Y | 30 | Y |
| | 13 | 13 | 252 | 980 | 950 | 850 | 89 | Y | 50 | Y |
| | 14 | 14 | 252 | 980 | 950 | 850 | 89 | Y | 50 | Y |
| | 15 | 15 | 252 | 980 | 950 | 850 | 88 | Y | 50 | Y |
| | 16 | 16 | 252 | 990 | 950 | 850 | 88 | Y | 30 | Y |
| | 17 | 17 | 252 | 980 | 950 | 900 | 87 | Y | 50 | Y |
| | 18 | 18 | 252 | 990 | 950 | 850 | 88 | Y | 40 | Y |
| | 19 | 19 | 252 | 990 | 950 | 850 | 89 | Y | 50 | Y |
| | 20 | 20 | 252 | 980 | 950 | 850 | 88 | Y | 50 | Y |
| COMPARATIVE EXAMPLE | 1 | *21 | 250 | 1170 | 1140 | 1040 | 85 | Y | 50 | Y |
| | 2 | *22 | 250 | 1170 | 1140 | 1040 | 85 | Y | 50 | Y |
| | 3 | *23 | 250 | 1170 | 1140 | 1040 | 85 | Y | 50 | Y |
| | 4 | *24 | 250 | 1250 | 1220 | 1120 | 85 | Y | 50 | Y |
| | 5 | *25 | 250 | 1170 | 1140 | 1040 | 85 | Y | 50 | N |
| | 6 | *26 | 250 | 1170 | 1140 | 1040 | 85 | Y | 50 | Y |
| | 7 | *27 | 250 | 1200 | 1170 | 1070 | 85 | Y | 50 | Y |
| | 8 | *28 | 250 | 1170 | 1140 | 1040 | 85 | Y | 50 | Y |
| | 9 | *29 | 200 | 1170 | 1140 | 1040 | 81 | Y | 50 | N |
| | 10 | *30 | 150 | 1190 | 1160 | 1060 | 75 | Y | 50 | N |
| | 11 | *31 | 250 | 1170 | 1140 | 1040 | 85 | Y | 50 | Y |
| | 12 | *32 | 251 | 1170 | 1140 | 1040 | 85 | Y | 50 | N |
| | 13 | *33 | 250 | 1170 | 1140 | 1040 | 85 | Y | 50 | Y |
| | 14 | *34 | 250 | 1220 | 1190 | 1090 | 85 | Y | 50 | Y |
| | 15 | *35 | 248 | 1170 | 1140 | 1040 | 85 | Y | 50 | N |
| | 16 | *36 | 250 | 1180 | 1150 | 1050 | 85 | Y | 50 | Y |
| | 17 | *37 | 250 | 1170 | 1140 | 1040 | 85 | Y | 50 | Y |
| | 18 | *38 | 250 | 1170 | 1140 | 1040 | 85 | Y | 50 | N |
| | 19 | *39 | 252 | 1170 | 1140 | 1040 | 85 | Y | 50 | Y |
| | 20 | *40 | 252 | 1170 | 1140 | 1040 | 85 | Y | 50 | Y |
| | 21 | *41 | 250 | 1190 | 1160 | 1060 | 85 | Y | 50 | N |
| | 22 | *42 | 250 | 1170 | 1140 | 1040 | 85 | Y | 50 | Y |
| | 23 | *43 | 250 | 1170 | 1140 | 1040 | 85 | Y | 50 | Y |
| | 24 | 44 | 250 | 1170 | 1140 | 1040 | 85 | Y | 50 | Y |
| | 25 | 44 | 250 | 1170 | 1140 | 1040 | 85 | Y | 50 | Y |
| | 26 | 44 | 250 | 900 | 870 | 770 | 85 | N | 0 | N |
| | 27 | 44 | 250 | 920 | 890 | 790 | 85 | Y | 50 | Y |
| | 28 | 44 | 250 | 900 | 870 | 770 | 85 | Y | 50 | Y |

The mark "*" indicates that the value fell out of the range defined in the present invention.

TABLE 3

| | | FINISH ROLLING | | | | COOLING | | | |
|---|---|---|---|---|---|---|---|---|---|
| RUN NUMBER | Steel No. | STARTING TEMPERATURE (° C.) | ENDING TEMPERATURE (° C.) | ROLLING REDUCTION (%) | THICKNESS (mm) | PERIOD TO START (s) | COOLING RATE (° C./s) | STOP TEMPERATURE (° C.) | COILING TEMPERATURE (° C.) |
| INVENTIVE EXAMPLE | 1 | 1 | 850 | 705 | 73 | 8 | 1.5 | 62 | 550 | 550 |
| | 2 | 2 | 860 | 715 | 65 | 12 | 1.5 | 66 | 550 | 550 |
| | 3 | 3 | 840 | 690 | 64 | 10 | 1.5 | 72 | 510 | 500 |
| | 4 | 4 | 840 | 695 | 73 | 8 | 1.5 | 58 | 550 | 550 |
| | 5 | 5 | 850 | 690 | 76 | 8 | 1.5 | 58 | 545 | 545 |
| | 6 | 6 | 840 | 690 | 71 | 8 | 1.5 | 56 | 550 | 550 |
| | 7 | 7 | 840 | 695 | 77 | 7 | 1.5 | 58 | 550 | 550 |
| | 8 | 8 | 850 | 705 | 71 | 8 | 1.5 | 78 | 510 | 510 |

TABLE 3-continued

| | | | FINISH ROLLING | | | | COOLING | | |
|---|---|---|---|---|---|---|---|---|---|
| RUN NUMBER | | Steel No. | STARTING TEMPERATURE (° C.) | ENDING TEMPERATURE (° C.) | ROLLING REDUCTION (%) | THICKNESS (mm) | PERIOD TO START (s) | COOLING RATE (° C./s) | STOP TEMPERATURE (° C.) | COILING TEMPERATURE (° C.) |
| | 9 | 9 | 850 | 705 | 79 | 6 | 1.5 | 62 | 550 | 550 |
| | 10 | 10 | 860 | 715 | 73 | 8 | 1.5 | 66 | 550 | 550 |
| | 11 | 11 | 840 | 695 | 76 | 8 | 1.5 | 58 | 550 | 550 |
| | 12 | 12 | 840 | 690 | 71 | 8 | 1.5 | 72 | 510 | 510 |
| | 13 | 13 | 850 | 705 | 71 | 8 | 1.5 | 58 | 560 | 550 |
| | 14 | 14 | 850 | 705 | 71 | 8 | 1.5 | 62 | 550 | 550 |
| | 15 | 15 | 850 | 705 | 83 | 5 | 1.5 | 78 | 510 | 510 |
| | 16 | 16 | 840 | 690 | 73 | 8 | 1.5 | 56 | 550 | 550 |
| | 17 | 17 | 850 | 705 | 76 | 8 | 1.5 | 62 | 550 | 550 |
| | 18 | 18 | 850 | 705 | 73 | 8 | 1.5 | 78 | 510 | 510 |
| | 19 | 19 | 860 | 715 | 71 | 8 | 1.5 | 66 | 550 | 550 |
| | 20 | 20 | 870 | 730 | 73 | 8 | 1.5 | 83 | 523 | 523 |
| COMPARATIVE EXAMPLE | 1 | *21 | 1040 | 895 | 79 | 8 | 1.5 | 138 | 550 | 550 |
| | 2 | *22 | 1040 | 895 | 79 | 8 | 1.5 | 138 | 550 | 550 |
| | 3 | *23 | 1040 | 895 | 79 | 8 | 1.5 | 158 | 500 | 500 |
| | 4 | *24 | 1120 | 975 | 79 | 8 | 1.5 | 38 | 880 | 880 |
| | 5 | *25 | 1040 | 895 | 79 | 8 | 1.5 | 140 | 545 | 545 |
| | 6 | *26 | 1040 | 895 | 79 | 8 | 1.5 | 138 | 550 | 550 |
| | 7 | *27 | 1070 | 925 | 79 | 8 | 1.5 | 150 | 550 | 550 |
| | 8 | *28 | 1040 | 895 | 79 | 8 | 1.5 | 166 | 480 | 480 |
| | 9 | *29 | 1040 | 895 | 79 | 8 | 1.5 | 138 | 550 | 550 |
| | 10 | *30 | 1060 | 915 | 79 | 8 | 1.5 | 146 | 550 | 550 |
| | 11 | *31 | 1040 | 895 | 79 | 8 | 1.5 | 138 | 550 | 550 |
| | 12 | *32 | 1040 | 895 | 79 | 8 | 1.5 | 198 | 400 | 400 |
| | 13 | *33 | 1040 | 895 | 79 | 8 | 1.5 | 138 | 550 | 550 |
| | 14 | *34 | 1090 | 945 | 79 | 8 | 1.5 | 158 | 550 | 550 |
| | 15 | *35 | 1040 | 895 | 79 | 8 | 1.5 | 138 | 550 | 550 |
| | 16 | *36 | 1050 | 905 | 79 | 8 | 1.5 | 162 | 500 | 500 |
| | 17 | *37 | 1040 | 895 | 79 | 8 | 1.5 | 138 | 550 | 550 |
| | 18 | *38 | 1040 | 895 | 79 | 8 | 1.5 | 140 | 545 | 545 |
| | 19 | *39 | 1040 | 895 | 79 | 8 | 1.5 | 138 | 550 | 550 |
| | 20 | *40 | 1040 | 895 | 79 | 8 | 1.5 | 138 | 550 | 550 |
| | 21 | *41 | 1060 | 915 | 61 | 15 | 1.5 | 174 | 480 | 480 |
| | 22 | *42 | 1040 | 895 | 79 | 8 | 1.5 | 138 | 550 | 550 |
| | 23 | *43 | 1040 | 895 | 79 | 8 | 1.5 | 138 | 550 | 550 |
| | 24 | 44 | 1040 | 895 | 79 | 8 | 1.5 | 138 | 550 | 550 |
| | 25 | 44 | 1040 | 895 | 79 | 8 | 1.5 | 198 | 400 | 400 |
| | 26 | 44 | 770 | 625 | 79 | 8 | 1.5 | 30 | 550 | 550 |
| | 27 | 44 | 790 | 645 | 79 | 8 | 1.5 | 38 | 550 | 550 |
| | 28 | 44 | 770 | 625 | 79 | 8 | 1.5 | 30 | 550 | 550 |

The mark "*" indicates that the value fell out of the range defined in the present invention.

On each of cross sections of the resultant hot-rolled steel sheets parallel to the rolling direction, a steel micro-structure was observed to measure an area fraction of structures satisfying: major grain diameter/minor grain diameter being 5.0 or more at positions of 0.25 t (t: sheet thickness) and 0.50 t (t: sheet thickness), and an average value of the area fractions was determined. Next, on each of cross sections of the resultant hot-rolled steel sheets parallel to the sheet thickness direction, grain boundaries were exposed by nitric-acid electrolytic etching, a line parallel to the sheet thickness direction was observed within a range of 0.25 t to 0.75 t (t: sheet thickness), and a number of grain boundaries crossing the line was measured to determine the "average minor grain diameter." In addition, from each of the resultant hot-rolled steel sheets, a Charpy impact test specimen was taken and subjected to the Charpy impact test at 25° C. Results of the above are shown in Table 4.

TABLE 4

| | | | STEEL MICRO-STRUCTURE | | EVALUATION | |
|---|---|---|---|---|---|---|
| RUN NUMBER | | Steel No. | STRUCTURES SATISFYING MAJOR AXIS/ MINOR AXIS BEING 5.0 OR MORE (area %) | AVERAGE MINOR AXIS (μm) | SURFACE QUALITY | CHARPY IMPACT VALUE AT 25° C. (J/cm$^2$) |
| INVENTIVE EXAMPLE | 1 | 1 | 95 | 80 | GOOD | 40 |
| | 2 | 2 | 90 | 65 | GOOD | 130 |
| | 3 | 3 | 98 | 70 | GOOD | 40 |
| | 4 | 4 | 95 | 50 | GOOD | 80 |
| | 5 | 5 | 90 | 48 | GOOD | 140 |

TABLE 4-continued

| | RUN NUMBER | Steel No. | STEEL MICRO-STRUCTURE STRUCTURES SATISFYING MAJOR AXIS/ MINOR AXIS BEING 5.0 OR MORE (area %) | AVERAGE MINOR AXIS (μm) | EVALUATION SURFACE QUALITY | CHARPY IMPACT VALUE AT 25° C. (J/cm$^2$) |
|---|---|---|---|---|---|---|
| | 6 | 6 | 98 | 65 | GOOD | 40 |
| | 7 | 7 | 97 | 80 | GOOD | 150 |
| | 8 | 8 | 90 | 90 | GOOD | 40 |
| | 9 | 9 | 96 | 95 | GOOD | 40 |
| | 10 | 10 | 90 | 85 | GOOD | 150 |
| | 11 | 11 | 98 | 70 | GOOD | 110 |
| | 12 | 12 | 97 | 62 | GOOD | 50 |
| | 13 | 13 | 70 | 80 | GOOD | 120 |
| | 14 | 14 | 96 | 87 | GOOD | 150 |
| | 15 | 15 | 95 | 86 | GOOD | 40 |
| | 16 | 16 | 90 | 89 | GOOD | 90 |
| | 17 | 17 | 98 | 92 | GOOD | 130 |
| | 18 | 18 | 97 | 89 | GOOD | 40 |
| | 19 | 19 | 90 | 90 | GOOD | 40 |
| | 20 | 20 | 96 | 85 | GOOD | 110 |
| COMPARATIVE EXAMPLE | 1 | *21 | 85 | 105* | GOOD | 20 |
| | 2 | *22 | 80 | 110* | GOOD | 30 |
| | 3 | *23 | 75 | 120* | GOOD | 20 |
| | 4 | *24 | 65* | 140* | GOOD | 25 |
| | 5 | *25 | 85 | 200* | GOOD | 30 |
| | 6 | *26 | 90 | 180* | GOOD | 25 |
| | 7 | *27 | 80 | 150* | GOOD | 10 |
| | 8 | *28 | 90 | 140* | GOOD | 15 |
| | 9 | *29 | 80 | 120* | GOOD | 20 |
| | 10 | *30 | 90 | 156* | GOOD | 25 |
| | 11 | *31 | 90 | 160* | GOOD | 30 |
| | 12 | *32 | 90 | 170* | GOOD | 25 |
| | 13 | *33 | 95 | 180* | GOOD | 20 |
| | 14 | *34 | 95 | 130* | GOOD | 25 |
| | 15 | *35 | 95 | 158* | GOOD | 30 |
| | 16 | *36 | 95 | 180* | GOOD | 25 |
| | 17 | *37 | 97 | 170* | GOOD | 10 |
| | 18 | *38 | 95 | 120* | GOOD | 25 |
| | 19 | *39 | 95 | 180* | GOOD | 5 |
| | 20 | *40 | 92 | 170* | GOOD | 25 |
| | 21 | *41 | 95 | 168* | GOOD | 20 |
| | 22 | *42 | 98 | 210* | GOOD | 10 |
| | 23 | *43 | 90 | 180* | GOOD | 21 |
| | 24 | 44 | 90 | 175* | GOOD | 10 |
| | 25 | 44 | 98 | 180* | GOOD | 10 |
| | 26 | 44 | 95 | 186* | HOT ROLLING FLAW | 12 |
| | 27 | 44 | 95 | 171* | HOT ROLLING FLAW | 21 |
| | 28 | 44 | 92 | 175* | HOT ROLLING FLAW | 13 |

The mark "*" indicates that the value fell out of the range defined in the present invention.

As illustrated in Table 4, in Inventive Examples of the present invention 1 to 20, their steel sheets all had good surface qualities, and their Charpy impact values at 25° C. were 40 J/cm$^2$ or more. In contrast, in Comparative Examples 1 to 25, at least one of their chemical compositions or steel micro-structures fell out of corresponding ranges defined in the present invention, and their toughnesses deteriorated. In addition, in Comparative Examples 26 to 28, their temperatures of the rough rolling were excessively low, which did not bring about the recrystallization and coarsened grains, causing hot rolling flaws, and their toughnesses also deteriorated.

INDUSTRIAL APPLICABILITY

According to the present invention, it is possible to provide efficiently a ferritic stainless steel sheet excellent in toughness. The ferritic stainless steel sheet is particularly suitable to an automobile exhaust flange member.

The invention claimed is:
1. A ferritic stainless steel sheet having a sheet thickness t of 5.0 to 12.0 mm, comprising
a chemical composition consisting of, in mass percent:
C: 0.001 to 0.010%;
Si: 0.01 to 1.0%;
Mn: 0.01 to 1.0%;
P: 0.04% or less;
S: 0.010% or less;
Cr: 10.0 to 20.0%;
Ni: 0.01 to 1.0%;
Ti: 0.10 to 0.30%;
V: 0.01 to 0.40%;
Al: 0.005 to 0.3%;
N: 0.001 to 0.02%;
B: 0 to 0.0030%;
Mo: 0 to 2.0%;
Cu: 0 to 0.3%;
Mg: 0 to 0.0030%;

Sn: 0 to 0.1%;
Sb: 0 to 0.1%;
Zr: 0 to 0.1%;
Ta: 0 to 0.1%;
Nb: 0 to 0.1%;
Hf: 0 to 0.1%;
W: 0 to 0.1%;
Co: 0 to 0.2%;
Ca: 0 to 0.0030%;
REM: 0 to 0.05%;
Ga: 0 to 0.1%; and
Bi: 0 to 0.1%,
with the balance being Fe and unavoidable impurities, wherein
in a steel micro-structure, on a cross section parallel to a rolling direction, an area ratio of structures each satisfying: major grain diameter/minor grain diameter being 5.0 or more is 90% or more, wherein the structures are a zone of at least 1 mm² at a position of 0.25 of the sheet thickness and 0.50 of the sheet thickness, and an average minor grain diameter of the structures is 100 μm or less, wherein the structures are measured on a line parallel to a sheet thickness direction within a range of 0.25 of the sheet thickness to 0.75 of the sheet thickness.

2. A hot coil made of the ferritic stainless steel sheet according to claim 1.

3. An automobile exhaust flange member made of the ferritic stainless steel sheet according to claim 1.

4. An automobile exhaust flange member made using the ferritic stainless hot coil according to claim 2.

5. A ferritic stainless steel sheet having a sheet thickness t of 5.0 to 12.0 mm, comprising
a chemical composition comprising, in mass percent:
C: 0.001 to 0.010%;
Si: 0.01 to 1.0%;
Mn: 0.01 to 1.0%;
P: 0.04% or less;
S: 0.010% or less;
Cr: 10.0 to 20.0%;
Ni: 0.01 to 1.0%;
Ti: 0.10 to 0.30%;
V: 0.01 to 0.40%;
Al: 0.005 to 0.3%;
N: 0.001 to 0.02%;
B: 0 to 0.0030%;
Mo: 0 to 2.0%;
Cu: 0 to 0.3%;
Mg: 0 to 0.0030%;
Sn: 0 to 0.1%;
Sb: 0 to 0.1%;
Zr: 0 to 0.1%;
Ta: 0 to 0.1%;
Nb: 0 to 0.1%;
Hf: 0 to 0.1%;
W: 0 to 0.1%;
Co: 0 to 0.2%;
Ca: 0 to 0.0030%;
REM: 0 to 0.05%;
Ga: 0 to 0.1%; and
Bi: 0 to 0.1%,
with the balance comprising Fe and unavoidable impurities, wherein
in a steel micro-structure, on a cross section parallel to a rolling direction, an area ratio of structures each satisfying: major grain diameter/minor grain diameter being 5.0 or more is 90% or more, wherein the structures are a zone of at least 1 mm² at a position of 0.25 of the sheet thickness and 0.50 of the sheet thickness, and an average minor grain diameter of the structures is 100 μm or less, wherein the structures are measured on a line parallel to a sheet thickness direction within a range of 0.25 of the sheet thickness to 0.75 of the sheet thickness.

6. A hot coil made of the ferritic stainless steel sheet according to claim 5.

7. An automobile exhaust flange member made of the ferritic stainless steel sheet according to claim 5.

8. An automobile exhaust flange member made using the ferritic stainless hot coil according to claim 6.

* * * * *